United States Patent [19]
Miyasaka et al.

[11] Patent Number: 6,122,073
[45] Date of Patent: Sep. 19, 2000

[54] COMMUNICATIONS TERMINAL AND INTERFACING METHOD THEREFOR

[75] Inventors: Masayo Miyasaka; Mitsuaki Teradaira; Asahiro Oguchi, all of Suwa, Japan

[73] Assignee: Seiko Epson Corporation, Tokyo, Japan

[21] Appl. No.: 08/870,136

[22] Filed: Jun. 5, 1997

[51] Int. Cl.[7] .................................. H04N 1/00
[52] U.S. Cl. .................. 358/434; 358/1.15; 358/437; 700/2
[58] Field of Search ................. 358/434, 1.15, 358/404, 437, 442, 468, 406, 444; 395/101, 114, 500; 700/1, 2, 11, 12, 17

[56] References Cited

U.S. PATENT DOCUMENTS

| | | | |
|---|---|---|---|
| 4,876,609 | 10/1989 | Ogura | 358/443 |
| 5,040,077 | 8/1991 | Hamano | 358/407 |
| 5,600,445 | 2/1997 | Omi | 358/296 |

FOREIGN PATENT DOCUMENTS

| | | |
|---|---|---|
| 0 486 031 | 5/1992 | European Pat. Off. . |
| 0 619 562 | 10/1994 | European Pat. Off. . |
| 0 652 533 | 5/1995 | European Pat. Off. . |
| 0 654 757 | 5/1995 | European Pat. Off. . |
| 62-137630 | 6/1987 | Japan . |
| 3-250968 | 11/1991 | Japan . |
| 6-274286 | 9/1994 | Japan . |

*Primary Examiner*—Andrew W. Johns
*Assistant Examiner*—Gregory Desire
*Attorney, Agent, or Firm*—Mark P. Watson

[57] ABSTRACT

A peripheral communications terminal and interfacing method whereby host terminal intercommunication can proceed when the communications terminal is off-line without requiring host driver interface modification. This communications terminal incorporates a communications enabling unit that selectably uses DTR signaling or similar handshaking to notify the host whether data can be received. This communications enabling unit is set to either a first "busy" mode indicating that receipt of streaming data is not possible when the processor of the communications terminal, which possesses at least a printing function, cannot further process data, or a second "override" mode which allows receipt of incoming data to continue even when the processor cannot process data. When the communications enabling unit is set to the override mode and a state in which the terminal processor cannot process data has occurred, the communications terminal control method of the present invention is able to automatically notify the host of such status.

18 Claims, 3 Drawing Sheets

COMMUNICATIONS TERMINAL AND INTERFACING METHOD THEREFOR

BACKGROUND OF THE INVENTION

1. Field of the Invention

The invention relates to a peripheral communication terminal such as a terminal printer, plotter, or other communications device that can be used, for example, in a point-of-sale ("POS") system, and relates particularly to an interfacing method for selectably interrupting serial communications between the terminal unit and a host processor.

2. Description of the Related Art

Personal computer-based information processing systems for point-of-sale (POS) system applications are commonly capable of using a variety of peripheral communications terminals connected to a host personal computer ("PC"). Examples of such data processing terminals include a customer display, cash drawer, printer, plotter, modem, and bar code reader. These data processing terminals are commonly connected to the PC using an RS-232C or similar serial communications port. Commands and subject data to be processed are transferred between the host personal computer and the terminal unit through this serial communications port.

A data terminal ready (DTR) signal, for example, is typically used by peripheral terminals to notify the host whether data or commands can be received. When the host thus detects an ACTIVE DTR signal, the host sets the data set ready (DSR) signal ACTIVE. Data loss is thus prevented by commencing data communication only after both the peripheral terminal and the host thus confirm that sending and receiving data therebetween is enabled.

Terminal printers are the most widely used type of peripheral communications terminals in POS systems. These printers can become "busy," and therefore become at least temporarily unable to send or receive data under a variety of conditions, such as when the printer's receive buffer becomes full, a printer transport problem or a paper jam occurs, or a standby mode is activated when, e.g., the operator opens the printer cover. When such a terminal printer becomes "busy", the DTR signal is set to INACTIVE. When the DTR signal is thus INACTIVE, the conventional host printer driver suspends data and command transmissions to the terminal unit until the DTR signal is again ACTIVE.

In addition to the conventional receipt printing functions using roll paper, some recent POS system terminal printers include such other functionality as slip printing using cut-sheet forms and magnetic ink character recognition. Some of the problems that can occur with such multiple function printers are described hereinbelow.

For example, if slip printing is accidentally selected, the printer automatically enters a standby mode to wait for the user to insert the slip printing form, and therefore sets the DTR signal to INACTIVE. The printing process is thus delayed and does not proceed until a form is actually inserted or the slip printing mode is canceled by user intervention even though the host device has prepared data for roll receipt printing.

Also, when a paper jam or other error occurs, the printing terminal again sets the DTR signal INACTIVE to stop data transfers. When the operator corrects the problem and resets the printer, the data that had already been transferred to the printer but not printed may have been irretrievably become lost in the interim.

Such problems could be resolved in the host software, for example, through detection that the printer is in a form loading standby state or detecting what printer error has occurred, and then sending a command (a "real-time command" below) causing an appropriate recovery routine to be executed. This process can, for example, be used to delete any unprocessed data still stored in memory and post it for redelivery to the terminal when it comes back on-line.

With a general-purpose serial port driver or printer driver, however, no data or commands can be sent while the DTR signal is INACTIVE. This means that such problems cannot be handled in software on the host device if conventional serial port interfacing is to be preserved. If the host software must handle such problems, a special driver capable of ignoring the DTR signal and accessing the serial device directly must be developed. Doing so, however, means that the information processing system cannot be developed using an unmodified general-purpose operating system. Moreover, when transmissions are executed by simply ignoring the DTR signal, a receive buffer overflow state can occur on the terminal side, potentially resulting in loss of the transmitted data and commands and degraded system reliability. And thus this method cannot be used in POS systems and other systems in which data reliability is essential.

It is known that some conventional terminal printers include a function for notifying the host of a change in terminal status without using a DTR signal. When this function has already been enabled according to an initialization command received from the host, such terminals notify the host when a particular status change has occurred by sending corresponding status data to the host. This function is called an "automatic status-back" (ASB) function described in greater detail hereinbelow. The DTR signal in this case is relegated to becoming an auxiliary or superfluous signal, and the host is able to determine the off-line status of the terminal without depending upon the DTR signal.

However, it should be realized for conventional automatic status-back to work, the host PC and the terminal printer it is communicating with must be able to recognize and issue ASB commands and responses. More importantly, backwards compatibility with legacy peripherals or host devices still mandates use of conventional DTR handshaking, thereby reintroducing the aforementioned off-line command recognition and throughput latency problems.

OBJECT OF THE INVENTION

It is, therefore, an object of the present invention to provide a communications terminal whereby standby and error states can be handled by software running on the host device using real-time commands without modifying the standards and specifications controlling serial communications between the host and serial device.

SUMMARY OF THE INVENTION

To achieve this and related objects, the peripheral communications terminal of the present invention comprises a communications enabling unit that selectably uses DTR signaling or similar handshaking to notify the host whether data can be received. This communications enabling unit is set to either a first "busy" mode indicating that receipt of streaming data is not possible when the processor of the communications terminal, which possesses at least a printing function, cannot further process data, or a second "override" mode which allows receipt of incoming data to continue even when the processor cannot process data. When the communications enabling unit is set to the override mode and a state in which the terminal processor cannot process data has occurred, the communications terminal of the present invention is able to automatically notify the host of such status.

More specifically, the peripheral communications terminal of the present invention comprises an interface for receiving command and image data transferred from a host device, a receive buffer for temporarily storing the received data, a processor for processing the data stored in the receive buffer, a status sending unit for sending the processor status or receive buffer status back to the host device via the aforementioned interface, and a communications enabling unit for notifying the host via the interface whether further data can be received. As mentioned above, the communications enabling unit defines a busy mode indicating that further receipt of data is not possible when the processor determines it cannot further process data, and an override mode in which allows receipt of incoming data to continue. When the processor becomes unable to process data when the communications enabling unit is set to the override mode, the status sending unit automatically notifies the host that data receiving is disabled.

By setting the communications enabling unit to the busy mode, data transfer between the terminal unit and the host is halted and already-received data stored in the receive buffer is protected from overflow in accordance with standard transfer processes which use a serial or parallel interface. If the communications enabling unit is set to the override mode, however, data transfer to the terminal is still possible even though the terminal cannot concurrently process it, and the host operating system does not prohibit data transfer. In this override mode, a software application executing on the host can therefore send command data to the communications terminal and include sophisticated error handling functionality which requires bidirectional information exchange between the host and terminal. The status sending unit determines the status of the processor, thereby enabling the host application to determine detailed status of the communications terminal and take necessary steps to protect the data stored in the receive buffer.

It therefore becomes possible with the communications terminal of the invention to selectably protect already transferred data using standard transfer methods by setting the communications enabling unit to the busy mode. By setting the communications enabling unit to the override mode, the range of operations that can be affected by the host application can be extended to inquiring as to the internal processes of the communications terminal so that errors and standby modes thereof can be flexibly handled by the host.

Preferably, communications enabling unit in the communications terminal of the present invention uses standard signaling to indicate whether data transfer is possible or not in both the busy and override modes. It is therefore possible to construct POS and related systems for specific purposes using high general utility operating systems and hardware without modifying the operating system of the host device.

The status of the terminal can also be relayed back to the host while operating in either the busy or override mode by incorporating functionality for determining the mode to which the communications enabling unit is set, and a function for automatically notifying the host by means of a status sending unit when the terminal becomes unable to process data. According to the preferred embodiments of the invention, these functions can be conveniently implemented through interdependent routines executing within the communications terminal when their associated program code statements are read by the terminal processing unit from a computer readable memory logically accessible thereto.

Loss of data that has been transferred but not processed can also be minimized when the communications enabling unit is in the busy mode by determining that further data receipt is not possible because the receive buffer is full, a terminal processing error or exception has been perceived, or occurrence of a standby mode in which the terminal unit is temporarily unable to process data stored in the receive buffer. In addition, by determining that further data transfer is not possible because the receive buffer is full when in the override mode, it is also possible to prevent data loss resulting from a receive buffer overflow condition discussed hereinabove.

It should be noted here that according to the preferred embodiments of the invention, the busy mode or override mode of the communications enabling unit can be manually selected by the user operating a hardware or software switch, or can be automatically selected by a host software application controlling a switching unit that can be accessed and operated through remote or local communication with the peripheral communications terminal.

When the aforementioned communications enabling unit is set to the override mode, commands can be sent from the host and processed by the communications terminal even when it is in a standby mode or error mode and therefore cannot ordinarily process the incoming data. However, when data processing by the communications terminal cannot proceed, the data stored to the receive buffer obviously remains unprocessed. Thus, when data is interpreted in the sequence stored to the receive buffer in a well-known ("FIFO", "first-in, first-out"), the host application cannot handle processor standby modes and error states. It is therefore preferable to provide a second interpreter for interpreting incoming transferred data as it passes from the receive interface to the receive buffer in addition to a conventional first interpreter for FIFO interpretation of data already stored within the receive buffer.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The preferred embodiments of the present invention are described hereinbelow with reference to the accompanying figures.

Embodiment 1

Figure 1:
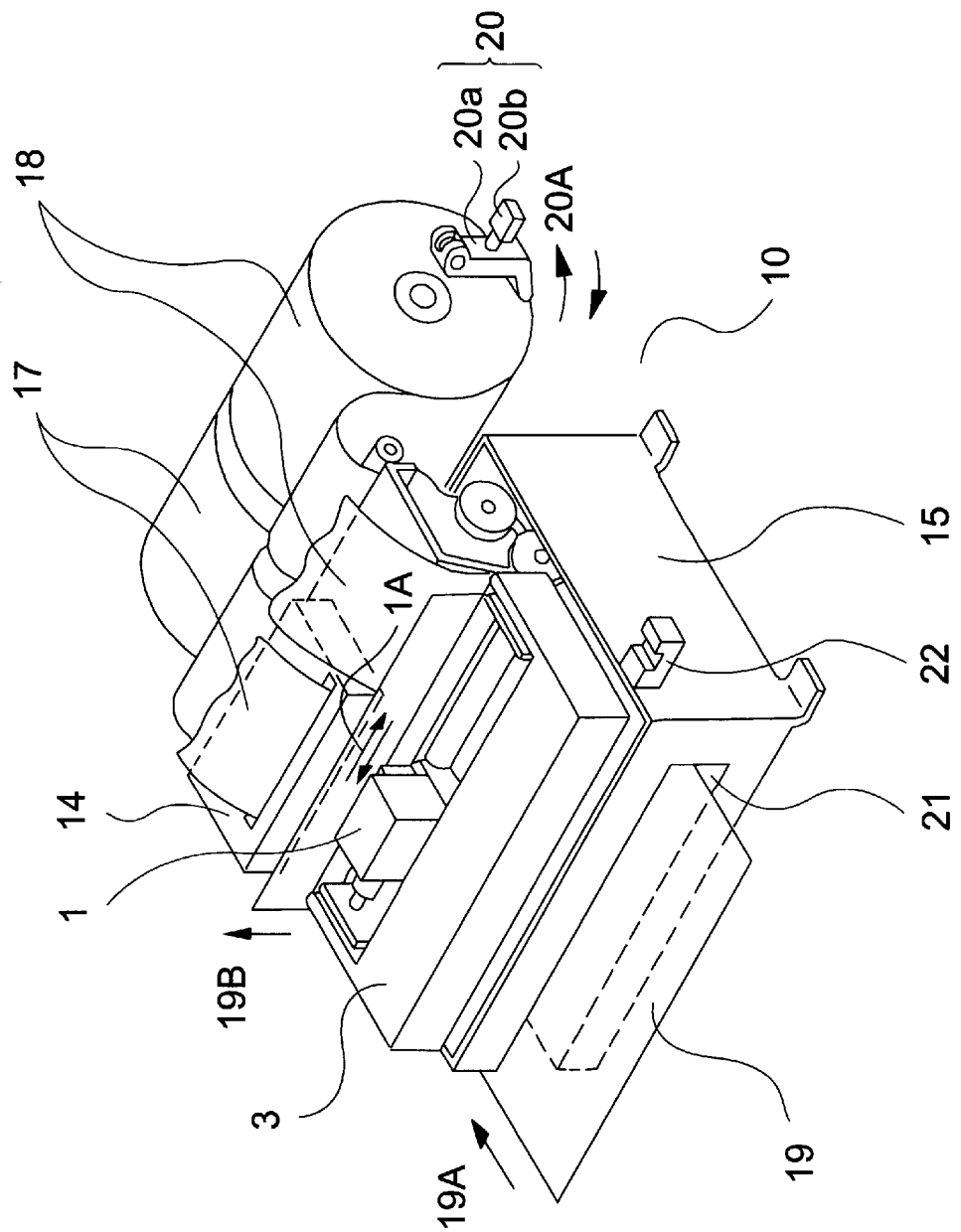
FIG. 1 is a perspective view of a terminal printer according to the preferred embodiments of the invention.

FIG. 1 is an overview of a terminal printer suitable for use in a POS system and shown by way of example only as a peripheral communications terminal according to the present invention. Note that terminal printer 10 of the present embodiment is a printer capable of printing to such recording media as slip paper 19, journal paper 18, and receipt paper 17. Slip paper 19 is a cut-sheet form of indefinite size and shape such as a payment or validation slip.

When slip paper 19 is inserted in the direction of arrow 19A from slip paper insertion opening 21 at the front of terminal printer 10, slip paper 19 is detected by a paper detector (not shown in the figures) and transported through the paper path inside case 15 to print head 1. Print head 1 is then driven in transverse direction 1A to print, and slip paper 19 is transported in the direction of arrow 19B out from terminal printer 10.

Here, terminal printer 10 uses a wire dot print head 1 to print through the ink ribbon contained in ribbon cassette 3 to slip paper 19 or journal paper 18 and receipt paper 17 as described below.

Both journal paper 18 and receipt paper 17 are continuous forms supplied as roll paper to terminal printer 10 in the present embodiment. Journal paper 18 and receipt paper 17 are transported to print head 1 through case 15 from the side opposite slip paper 19. After receipt information is printed to receipt paper 17, the paper is advanced to cutter unit 14, and the receipt is cut off and handed to the customer. Sales information that should be tracked for later use is also printed to journal paper 18 to create a sales journal which is then wound onto a take-up roll (not shown in the figure), for example, for storage.

A near-end detector 20 is also disposed for both receipt paper 17 and journal paper 18 to detect when the end of the paper roll is approaching. This near-end detector 20 comprises, for example, a detector lever 20a that contacts the side of the paper roll and rocks in the direction of arrow 20A following the outside diameter of the roll, and switch 20b. Switch 20b is turned on and off by detector lever 20a. When the roll diameter decreases as the end of the roll is approached, detector lever a swings to the inside, thereby causing switch 20b to turn on. This "on" state can be used to detect that the end of the roll paper is near.

Figure 2:
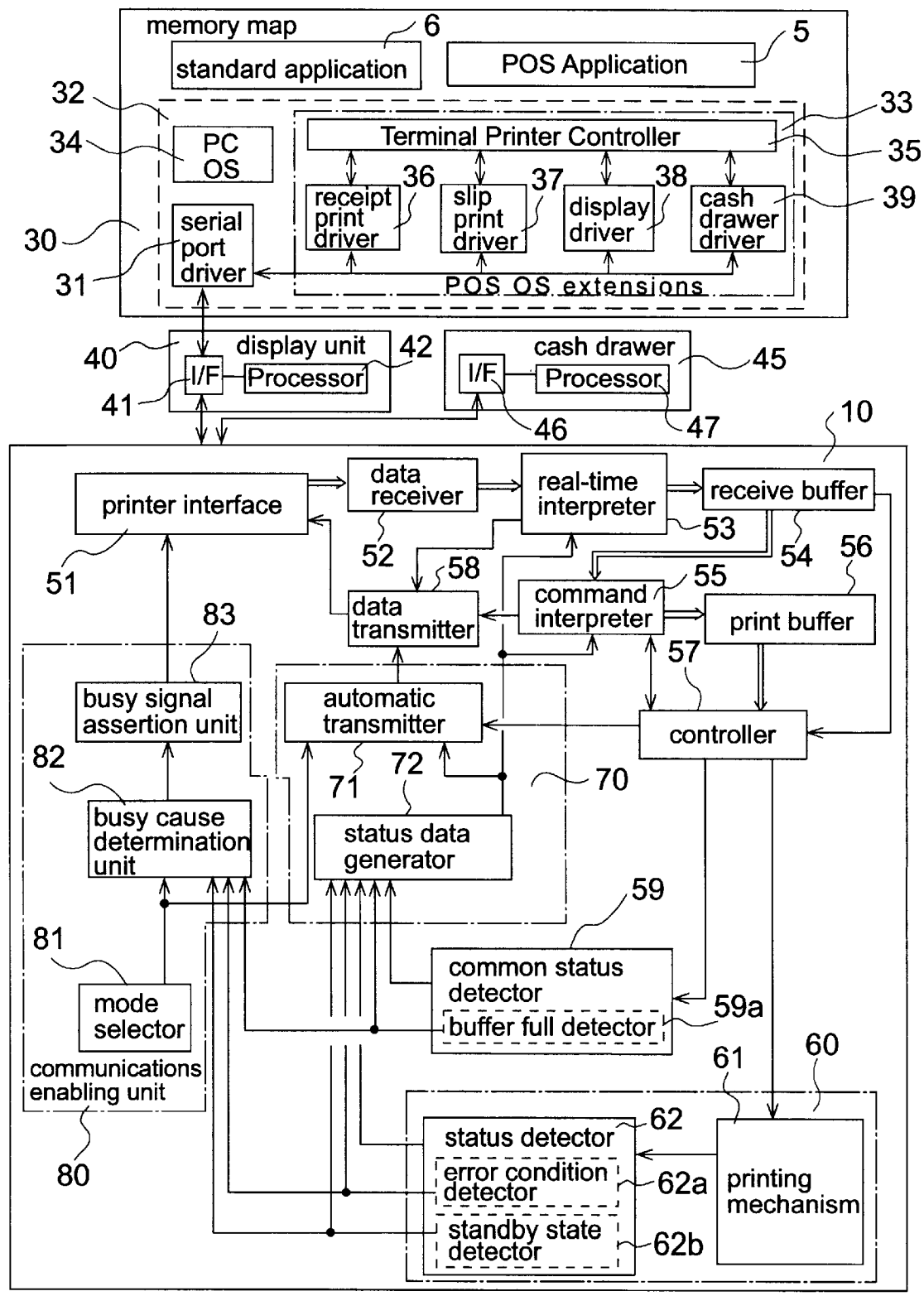
FIG. 2 is a block diagram of a POS system according to the preferred embodiments comprising a PC host and the terminal printer shown in FIG. 1.

Though not shown in these figures a cover is also provided on case 15 of terminal printer 10. This cover is typically closed except when changing roll paper 17 or 18 or replacing ribbon cassette 3. For safety and reliability reasons, printing may commence or continue only when the cover is closed. A cover detector 22 for detecting whether this cover is open or closed is therefore provided on case 15. When the cover is open the printer automatically enters a standby mode, which pauses printing of the current task FIG. 2 is a block diagram of a POS system using PC 30 as the host device and terminal printer 10 of the present embodiment as the communications terminal. Customer display 40, terminal printer 10, and cash drawer 45 are logically connected through serial communications port (an RS-232C port in this example) driver 31 of PC 30 in this POS system, thereby enabling data to be sent from PC 30 through the RS-232C port to these three communications terminals and processed. PC 30, customer display 40, and terminal printer 10 are physically connected through an RS-232C interface, thereby enabling data sending and receiving between the connected devices.

Cash drawer 45 is further connected to terminal printer 10, thus enabling PC 30 to control cash drawer 45 by sending appropriate commands to terminal printer 10. It should be noted that customer display 40 has a pass-through function, and display processor 42 processes commands and data received from PC 30 only when customer display 40 is selected as the recipient based on a command issued from PC 30. Terminal printer 10 has a similar function, and commands and data received from PC 30 are processed only when terminal printer 10 is selected to be the recipient or target of the informational exchange.

It should be further noted here that the DTR signal from customer display 40 is input to the CS signal terminal of PC 30 so that there is no conflict with the DTR signal from terminal printer 10. Note, further, that customer display 40 does not transmit status data or other data to PC 30, and so there is no conflict with similar data issued from terminal printer 10 according to this embodiment.

As a result of being thus connected, the complete operating system 32 of PC 30 in this embodiment therefore also comprises in addition to serial communications port driver 31, POS system operating system (OS) 33 and basic OS 34. Basic PC OS 34 controls the keyboard, display, and other conventional components of PC 30, and the software applications that control these components. POS system OS 33 includes control system 35 for controlling terminal printer 10, customer display 40, and cash drawer 45; receipt printer driver 36 for controlling terminal printer 10 to print receipts, the sales journal, and other continuous forms; slip printer driver 37 for controlling terminal printer 10 to print slips; display driver 38 for controlling customer display 40; and driver 39 for controlling cash drawer 45.

The POS application program 5 of PC 30 as well as spreadsheets and other application programs 6 that can be used on PC 30 operate under the control of basic OS 34 and/or POS system OS 33. Sending and receiving data between customer display 40, terminal printer 10, and cash drawer 45 is also handled by drivers 36–39, serial port driver 31, and POS system OS 33.

When terminal printer 10 receives data through printer interface 51, an interrupt is generated and data receiver 52 captures the data from the interface. During the interrupt process the data captured from printer interface 51 is passed through real-time command interpreter 53 whereby any real-time commands are interpreted, and is then stored to the receive buffer. When real-time command interpreter 53 recognizes a real-time command in the data from data receiver 52, the particular process corresponding to that command is executed. The data stored in receive buffer 54 after passing real-time command interpreter 53 is then extracted in the sequence stored (FIFO) by command interpreter 55 and interpreted. If the interpreted data code is a command, that command is processed by controller 57 serving as the primary information processor for the communication terminal in this embodiment. If the interpreted data is print data, the data is stored to the print buffer 56. The controller 57 then controls printing unit 60 according to command, and sends the print data stored to print buffer 56 to printing unit 60 to control printing unit 60 and print the data.

In addition to setting up and controlling printing unit 60 and managing the print data, controller 57 also has a function for monitoring the status of the various parts of terminal printer 10 and outputting the status results to common status detector 59. For example, when receive buffer 54 is nearly full or terminal printer 10 is in a standby mode waiting for slip paper 19 loading, controller 57 notifies common status detector 59 of that status. The status of printer mechanism 61 in printing unit 60 is also supplied to status detector 62. The printer mechanism status can include, for example, that printer mechanism 61 is in a standby mode in which data processing is paused because the cover is open, an error mode caused by a paper jam, for example, or that the near-end of the roll paper has been detected.

The status detected by common status detector 59 and status detector 62 is supplied to status data generator 72 of status transmitter 70.

Status transmitter 70 has a function for notifying the host of the status of the terminal printer 10 by means of automatic status transmitter 71. Note that the terminal printer 10 status information includes, for example, the receive buffer status and the status of printer mechanism 61 supplied to status data generator 72. Automatic status transmitter 71 is controlled by controller 57 to transmit the status data when a particular status change occurs. It is therefore possible to select the status used as the trigger for sending the status data when the status changes by means of a specific command from the host device (PC 30 in this embodiment).

The status data output from automatic status transmitter 71 is supplied to printer interface 51 through data transmitter 58, and is output therefrom to the RS-232C serial port driver 31 of the host. The status data is then relayed to the application program 5 through POS system OS 33, which has a serial driver 31 as described hereinabove. The application program 5 can then select the process appropriate to the current terminal printer 10 status, and respond appropriately to terminal printer 10.

By providing status transmitter 70 described above, the status data is transferred to the application program 5 when the status of the printing processor or terminal printer 10 changes, and the application program can therefore determine the overall condition of terminal printer 10.

Furthermore, the processing load associated with status data sending and receiving is reduced on both the host and the terminal printer because the status data is sent only when the status changes. The effective serial communications throughput can therefore be improved.

The buffer full status alert 59a of common status detector 59 indicating that the receive buffer is full, and the error condition alert 62a and standby state alert (status) 62b of status detector 62 in printer mechanism 61, are also supplied to busy cause determination unit 82 of communications enabling unit 80.

When buffer full status 59a, error condition alert 62a, or standby state alert 62b is detected, busy signal setting unit 83 outputs a busy signal to printer interface 51, thereby indicating to the PC (host) 30 that data sending is prohibited, and thus preventing data loss caused by data being sent from the host but not intercepted or stored in the receive buffer 54 of the terminal printer 10.

In other words, the DTR (data terminal ready) signal of the RS-232C port is used as a busy signal to enable or disable data transmission. Data is transmitted through the host RS-232C serial port driver 31 and printer drivers 36 and 37 only when the DTR signal is ACTIVE. When terminal printer 10 is busy and the DTR signal is therefore INACTIVE, data transmission is stopped.

Alternatively, according to the present embodiment, when a particular printer status changes, e.g., when the near-end of a paper roll is detected, and status data is transmitted from the terminal printer to the host, POS application program 5 may output a command to terminal printer 10 to confirm the reported status or to instruct terminal printer 10 to send all status data so that the remaining printer status levels can be determined.

In a conventional terminal printer these commands are accumulated with the print data in receive buffer 54, and are executed in FIFO sequence as data processing progresses and each command is interpreted. This means that the delay between command data storage and command data execution is directly related to the amount of non-command data accumulated before the command data in receive buffer 54. As a result, if there is a significant amount of non-command data accumulated in receive buffer 54, a correspondingly significant amount of time may be required before command processing and execution begins.

To resolve this problem, terminal printer 10 according to the present invention comprises real-time command interpreter 53 and routes any received real-time commands to real-time command interpreter 53 before they are stored in receive buffer 54. Real-time command interpreter 53 can therefore interpret the command before the data is stored so that an appropriate processes can be executed in quick succession. Real-time commands can be discriminated by detecting, for example, the two bytes GS and R encoded in the data stream and then evaluating the value of the one byte n following these two bytes. Examples of the processes that can be executed based on the value of n are shown in the following Table 1.

TABLE 1

| n | Command |
|---|---|
| 0 | Send printer status |
| 1 | Send reason for off-line status |
| 2 | Send reason for error status |
| 3 | Send status of continuous form detector |
| 4 | Send slip form paper detector and slip paper status |
| 5 | Send validation form paper detector and validation paper status |
| 6 | Cancel slip paper wait state |
| 7 | Recover from error (resume printing) |
| 8 | Recover from error (clear buffer) |

Unlike command interpreter 55, real-time command interpreter 53 can thus interpret and execute commands received directly from data receiver 52. Processes specified by a real-time command can therefore be performed in real-time irrespective of the sequence of data and commands waiting to be processed in receive buffer 54. Real-time commands will therefore not be lost without being interpreted even when receive buffer 54 is full and received data and further incoming commands cannot be stored to receive buffer 54. Processes indicated by a real-time command will therefore be reliably executed on the terminal printer 10. For example, if real-time command interpreter 53 receives real-time command n=0 (e.g., the printer status request command herein), the status data accumulated in status data generator 72 will be output from data transmitter 58 to the application program 5 running on the host 30.

It is therefore possible in the present embodiment to control terminal printer 10 using real-time commands, and to execute without any time delay the same processes controlled according to commands stored to receive buffer 54 and interpreted by command interpreter 55.

The application program 5 can also flexibly control terminal printer 10 because real-time commands are processed by terminal printer 10 without a time delay caused by receive buffer 54. For example, application program 5 can cancel an error state, or cancel slip printing and start receipt printing when terminal printer 10 is in a standby mode waiting for slip paper 19 to be loaded.

Furthermore, when an error occurs and terminal printer 10 enters a standby mode, a busy state is determined by busy cause determination unit 82 of communications enabling unit 80. This causes the DTR signal to go INACTIVE in busy signal setting unit 83 of communications enabling unit 80. The host OS 32 therefore stops data transmission to terminal printer 10. As a result, if the host application program 5 then attempts to send a real-time command to terminal printer 10, the command transmission is blocked by the host OS 32 and the command will therefore not be sent to terminal printer 10.

This means that processes using real-time commands will not be executed when a busy state occurs even if application program 5 has a function for using real-time commands and terminal printer 10 has a function for interpreting real-time commands, and the practical effect of processing real-time commands is thus limited.

It is also possible for application program 5 to directly control the serial port without using the host OS 32, or to create dedicated software such as printer drivers using real-time commands for application program 5 and run this software on a PC such as PC 30. However, creating an application program 5 without using operating system 32 is extremely difficult and time consuming, and if the functionality of OS 32 is not used, the application program 5 must be separately developed to run on PCs having different configurations. Incorporating the drivers and other control components into application program 5 also makes the program extremely large and expensive. It is therefore not effective to create a POS application that uses real-time commands and operates on PCs from different manufacturers without using operating system 32.

Furthermore, using a dedicated operating system means that boxed or shrink-wrap spreadsheets and other industry-standard compatible software applications cannot be used, and system extensibility is thus lost. Customization to specific user operating environments and applications is also difficult.

Busy cause determination unit 82 of communications enabling unit 80 in terminal printer 10 of the present embodiment is therefore able to determine the cause for outputting the busy signal. Busy signal selector 82 selects a busy mode in which a busy state is indicated when error status 62*a*, standby status 62*b*, or buffer full status 59*a* occurs, or an override mode in which a busy state is indicated only when buffer full status 59*a* occurs.

The override mode can indicate a busy state when buffer full status 59*a* occurs because data could be lost if a busy state is not posted when the receive buffer is full. However, if automatic status transmitter 71 notifies the host application when the receive buffer is full and the application therefore interrupts transmission of all data other than real-time commands, it is also possible to configure the override mode to not output a busy signal (ACTIVE DTR signal) under any circumstances.

In this embodiment, the busy and override modes are selected using a DIP switch mode selector 81 in the terminal printer 10. When the override mode is selected by means of DIP switch mode selector 81 in terminal printer 10 according to the present embodiment, automatic status transmitter 71 is set to transmit the status data when a busy state occurs for any cause even if a status transmission control command is not supplied to the automatic status transmitter 71. It is therefore possible for application program 5 to determine from the status data that terminal printer 10 is in a busy state whenever a potential busy event occurs even if the DTR signal is not set to INACTIVE, and can therefore accomplish a process for stopping data transmission and assuring data transmission reliability whenever terminal printer 10 is busy.

Terminal printer 10 according to the present embodiment can thus set busy cause determination unit 82 to an override mode by means of DIP switch mode selector 81 in an application environment using real-time commands so that busy signal setting unit 83 does not set the DTR signal to an INACTIVE level when a standby mode, error state, or other busy state occurs. Real-time commands can therefore be transmitted and used effectively even during standby modes and error modes, and the application program 5 can be written to appropriately handle various printer problems.

On the other hand, when the host OS 32 is able to transmit real-time commands even when the DTR signal is ACTIVE, it is possible to protect transmitted data without using automatic status transmitter 71 functionality by setting busy cause determination unit 82 to a busy mode by means of DIP switch mode selector 81 and setting the DTR signal INACTIVE when any normal busy cause occurs, including a standby mode, error, or buffer full state.

Figure 3:
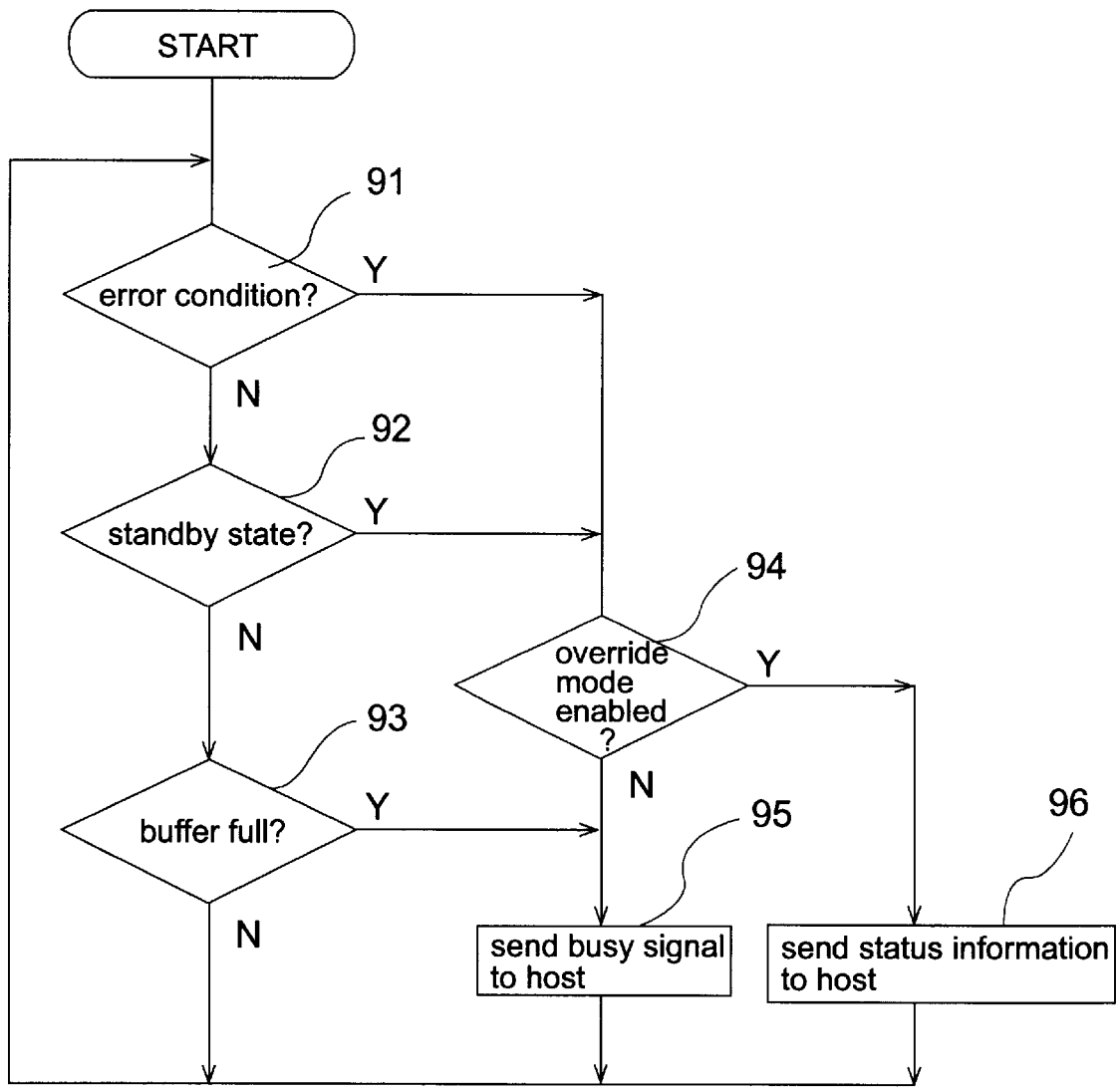
FIG. 3 is a flow chart used to describe the terminal unit processing used for electively issuing a busy signal to the PC of FIG. 2.

FIG. 3 is a flow chart used to describe the busy signal output process of communications enabling unit 80 in terminal printer 10 according to the present embodiment. As shown in FIG. 3, communications enabling unit 80 polls for potential error conditions, standby conditions, and buffer full states in steps 91, 92, and 93, respectively. When an error condition or standby state is detected in step 91 or 92, the status mode to which mode selector 81 is set is detected in step 94.

If mode selector 81 is set to the override mode described hereinabove, the error condition or standby state detected is sent to the host by automatic status transmitter 71 in step 96. A busy signal, however, is not generated. On the other hand, it is determined in step 94 that the busy mode is selected, or a buffer full state is detected in step 93, a busy signal is generated in step 95 and sent to the host to stop data transmission by the host.

It should be noted that an automatic status transmission function is selected in the present embodiment when the override mode described above is selected a busy signal is not output is selected by mode selector 81, by means of a DIP switch or other types of selection mechanism. It will be obvious to those skilled in the art, however, that the present invention shall not be so limited. Specifically, it is not always necessary to select an automatic status transmission function when the override mode is selected. This is because the host can detect printer busy states and command a safe recovery operation without busy signal and automatic status signal transmissions if the host transmits a real-time command instructing the terminal printer to return the printer status at intervals short enough to prevent a receive buffer 54 overflow state.

Embodiment 2

It should be noted here that the selection of the busy or override mode described in the preceding embodiment can also be accomplished by means of a software switch. It is also possible for the application program controlling terminal printer 10 to control mode selector 81. It is furthermore possible for the host to change the setting of busy cause determination unit 82 according to the application to change the specific busy causes as needed. Integration of these features and aspects of the invention are detailed hereinbelow with reference to the second embodiment of the invention.

Referring back to FIG. 2, when printer interface 51 receives from the host a command (e.g., the automatic status back (ASB) command) enabling the automatic status transmission function, the ASB command is interpreted by command interpreter 55 and automatic status transmitter 71 is set to a state for executing the corresponding ASB process. It should be noted that the enable/disable state of the automatic status transmission function, and the cause for status transmission (the ASB function startup cause) can be separately specified using the ASB command. For example, when the automatic status transmission function is set to transmit the status when an error occurs, the ASB function operates to transmit the status when any error occurs.

The override mode is simultaneously selected by command interpreter 55 at this time, and the ASB function startup signal is also supplied to busy cause determination unit 82. As a result, the ASB function startup signal is removed from the potential set of busy cause candidates. For example, if errors are specified as a ASB function startup cause, errors are eliminated from the candidates for causing a busy state. This means that when an error occurs, printer status data is output to the host rather than a conventional busy signal.

It is therefore possible to customize busy signal and selectably prohibit busy signal transmission by specifying a set of potential causes as ASB function initialization causes using the ASB command.

Terminal printer 10 according to the present embodiment can thus switch between a mode (busy mode) in which the DTR signal, which is used as a busy signal, is set to INACTIVE, or a mode (override mode) in which the DTR busy signal is not set INACTIVE, when printing processor 60 is unable to process data sent through the RS-232C port and stored to receive buffer 54.

Therefore, while the host software application has a real-time command interpreting and execution function, the terminal printer is set to an override mode when data cannot be transmitted when terminal printer 10 is transmitting a busy signal. The software application is therefore able to control terminal printer 10 even when terminal printer 10 is in a busy state due to an error state cause or standby state cause, error conditions and standby states can therefore be safely and reliably handled by the software application. The load on the operator is therefore also eased, and the safety of sales data and other data managed by the POS system can be assured.

On the other hand, when the terminal printer is connected to a host that is capable of transmitting real-time commands and other data even when a busy signal is being transmitted from the terminal printer to the host, communications with the host can be managed using a DTR signal without using an automatic status transmission function by setting the terminal printer to a busy mode. Data safety can therefore be assured, and the terminal printer can be safely recovered from, for example, error states.

Moreover, by controlling the causes for the which the DTR signal is set INACTIVE by the terminal printer, real-time command functions can be used effectively as described above without modifying the specifications of the host operating system relating to the DTR signal. It is therefore possible to build a POS system or other application-specific system without impairing the ability to use general-purpose software applications or printers, and a system capable of restoring a printer from an error state or standby mode to normal printer operation by means of software application control can be achieved.

It should be noted that while a terminal printer suitable to a POS system has been used by way of example only as the communications terminal of the invention in the embodiment described above, the communications terminal of the invention shall not be limited to a terminal printer. The communications terminal of the invention can, for example, be a plotter, scanner, modem, or other communications terminal connectable to a serial interface. It will also be obvious that the invention can be applied to a printer or other device connected to a host via a parallel interface.

Moreover, when the invention is applied to these or other communications terminals, the software application of the host can solve communications terminal problems even when the communications terminal is unable to process data sent to or stored by the communications terminal.

Therefore, when an error, for example, occurs in the communications terminal, the application can handle the problem rather than waiting for the operator to correct the problem.

Operator responsibilities are therefore lightened, the potential for operational errors is eliminated, and a safe, high reliability system can be constructed using low cost hardware and software, including PCs and operating systems, that are easy to customize and have high general utility.

As described above, the communications terminal of the present invention can operate in a busy mode in which a busy signal is output due to such standard causes as errors, standby states, and buffer full states to notify the host that data processing is not possible, and an override mode in which commands for handling errors and standby states can be received and processed because a busy signal is not output due to such causes.

It is therefore possible with the communications terminal of the invention to run software applications capable of appropriately handling error states and standby states occurring at the communications terminal under a general purpose operating system comprising standard communications terminal drivers, and the full functionality of the software application and operating system can therefore be realized.

Moreover, by using in place of a busy signal an automatic status transmission function for notifying the software application that an event such as a standby state has occurred when such an event occurs, system reliability and the safety of data sent from the host can be assured even when the override mode is selected.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A communications terminal, comprising:
   an interface for exchanging data with a host device;
   a buffer in communication with said interface for storing data received by said interface;
   a first processor in communication with said buffer for retrieving and processing the data stored in said buffer in a first-in-first-out sequence;
   a second processor in communication with said interface and said first processor for interpreting at least a portion of the data received by said interface and for controlling said first processor to recover from a disabled state in accordance with interpreted data comprising a first predetermined data;
   a status transmitter in communication with said first processor and said interface for transmitting status of at least said first processor to the host device; and a communications enabling unit in communication with said interface, said buffer and said first processor for selectively signalling the host device to halt transmission of data from the host device upon detection of at least one of a buffer full condition and said first processor being in the disabled state, said communications enabling unit defining:
- a first mode in which said communications enabling unit signals the host device to halt data transmission when said first processor is detected as being in the disabled state;
- a second mode in which said communications enabling unit permits data transmission between the host device and the terminal even when said first processor is detected as being in the disabled state; and
- a switching unit responsive to at least one of an operator and the host device for selecting one of the first and second modes of said communications enabling unit.

2. The communications terminal of claim 1, wherein said switching unit comprises a switch operable by the operator.

3. The communications terminal of claim 1, wherein said first processor comprises a printing mechanism that prints on recording media in accordance with data stored in said buffer.

4. The communications terminal of claim 1, wherein said interface comprises a serial interface coupled to the host device.

5. The communications terminal of claim 1, wherein said status transmitter is enabled to transmit the status of at least said first processor to the host device when said communications enabling unit detects that said first processor is in the disabled state and when said second mode of said communications enabling unit is set by said switching unit.

6. The communications terminal of claim 1, wherein said status transmitter is enabled to transmit the status of at least said first processor to the host device upon interpretation of a second predetermined data by one of said first and second processor and when said second mode of said communications enabling unit is set by said switching unit.

7. The communications terminal of claim 6, wherein said second predetermined data comprises at least real-time command data.

8. A peripheral communications terminal, comprising:
- an interface for exchanging data with a host device;
- a buffer in communication with said interface for storing data received by said interface;
- a first processor in communication with said buffer for retrieving and processing the data stored in said buffer in a first-in-first-out sequence, the first processor being set to a disabled state upon occurrence of at least one of a plurality of disabling events;
- a second processor in communication with said interface and said first processor for interpreting at least a portion of the data received by said interface and for controlling said first processor to recover from the disabled state in accordance with interpreted data comprising a first predetermined data;
- a status transmitter in communication with said first processor and said interface for transmitting status of at least said first processor to the host device; and
- a communications enabling unit in communication with said interface, said buffer and said first processor for selectively signalling the host device to halt transmission of data from the host device upon detection of at least one of a buffer full condition and said first processor being in the disabled state, said communications enabling unit defining:
  - a first mode in which said communications enabling unit signals the host device to halt data transmission when said first processor is detected as being in the disabled state;
  - a second mode in which said communications enabling unit selectively signals the host device to data transmission even when said first processor is detected as being in the disabled state based on a second predetermined data, the second predetermined data specifying at least one of the disabling events to override; and
  - a switching unit responsive to at least one of an operator and the host device for selecting one of the first and second modes of said communications enabling unit.

9. A communications terminal control method, comprising the steps of:
- retrieving and processing data from a host device in a first-in-first-out sequence;
- interpreting at least a portion of the retrieved data and forcing recovery from a disabled state to an online state in accordance with interpreted data comprising a first predetermined data;
- transmitting status of the communications terminal to the host device;
- detecting at least one of a buffer full condition and the disabled state; and
- selectively signalling the host device to halt transmission of data from the host device to the communications terminal upon detection of at least one of the buffer full condition and the disabled state in said detecting step and according to a selected one of:
  - a first mode requiring the host device to halt data transmission when the disabled state is detected in said detecting step; and
  - a second mode permitting data transmission between the host device and the communications terminal even when the disabled state is detected in said detecting step; and
- selecting one of the first and second modes in response to at least one of an operator and the host device.

10. The method of claim 9, wherein the disabled state is detected upon the occurrence of at least one of a plurality of disabling events.

11. The method of claim 10, wherein the second mode permits data transmission between the host device and the communications terminal based on a second predetermined data retrieved and processed in said retrieving and processing steps, the second predetermined data specifying at least one of the disabling events to override.

12. A point-of-sale system, comprising:
- a host device; and
- a communications terminal coupled to said host device, said communications terminal comprising:
  - an interface for exchanging data with said host device;
  - a buffer in communication with said interface for storing data received by said interface;
  - a first processor in communication with said buffer for retrieving and processing the data stored in said buffer in a first-in-first-out sequence;
  - a second processor in communication with said interface and said first processor for interpreting at least a portion of the data received by said interface and for controlling said first processor to recover from a disabled state in accordance with interpreted data comprising a first predetermined data;

a status transmitter in communication with said first processor and said interface for transmitting status of at least said first processor to said host device; and a communications enabling unit in communication with said interface, said buffer and said first processor for selectively signalling said host device to halt transmission of data therefrom upon detection of at least one of a buffer full condition and said first processor being in the disabled state, said communications enabling unit defining:

a first mode in which said communications enabling unit signals said host device to halt data transmission when said first processor is detected as being in the disabled state;

a second mode in which said communications enabling unit permits data transmission from said host device even when said first processor is detected as being in the disabled state; and a switching unit responsive to at least one of an operator and said host device for selecting one of the first and second modes of said communications enabling unit.

13. The system of claim 12, wherein said switching unit comprises a switch operable by the operator.

14. The system of claim 12, wherein said first processor comprises a printing mechanism that prints on recording media in accordance with data stored in said buffer.

15. The system of claim 12, wherein said interface comprises a serial interface.

16. The system of claim 12, wherein said status transmitter is enabled to transmit the status of at least said first processor to the host device when said communications enabling unit detects that said first processor is in the disabled state and when said second mode of said communications enabling unit is set by said switching unit.

17. The system of claim 12, wherein said status transmitter is enabled to transmit the status of at least said first processor to the host device upon interpretation of a second predetermined data by one of said first and second processor and when said second mode of said communications enabling unit is set by said switching unit.

18. The system of claim 17, wherein said second predetermined data comprises at least real-time command data.

\* \* \* \* \*

UNITED STATES PATENT AND TRADEMARK OFFICE
CERTIFICATE OF CORRECTION

PATENT NO.    : 6,122,073
DATED         : September 19, 2000
INVENTOR(S)   : Masayo Miyasaka, et al.

It is certified that error appears in the above-identified patent and that said Letters Patent is hereby corrected as shown below:

<u>Title page,</u>
Please add item --[30] Foreign Application Priority Data, June 5, 1996 [JP] Japan 8-143352--.

Signed and Sealed this

Twenty-sixth Day of June, 2001

Attest:

NICHOLAS P. GODICI
*Attesting Officer*    *Acting Director of the United States Patent and Trademark Office*